United States Patent
Kim et al.

(10) Patent No.: US 8,045,029 B2
(45) Date of Patent: Oct. 25, 2011

(54) CMOS IMAGE SENSOR FOR HIGH SPEED SIGNAL PROCESSING

(75) Inventors: Nam-Ryeol Kim, Chungcheongbuk-do (KR); Song-Yi Kim, Chuncheongbuk-do (KR); Chang-Min Bae, Chungcheongbuk-do (KR); Hack-Soo Oh, Chungcheongbuk-do (KR)

(73) Assignee: Intellectual Ventures II LLC, Wilmington, DE (US)

( * ) Notice: Subject to any disclaimer, the term of this patent is extended or adjusted under 35 U.S.C. 154(b) by 791 days.

(21) Appl. No.: 11/114,386

(22) Filed: Apr. 25, 2005

(65) Prior Publication Data

US 2005/0253947 A1  Nov. 17, 2005

(30) Foreign Application Priority Data

Apr. 26, 2004  (KR) .................. 10-2004-0028769

(51) Int. Cl.
*H04N 5/217* (2011.01)
*H04N 9/64* (2006.01)
*H04N 3/14* (2006.01)

(52) U.S. Cl. .................. 348/308; 348/241; 348/245

(58) Field of Classification Search .................. 348/241, 348/245, 302, 308
See application file for complete search history.

(56) References Cited

U.S. PATENT DOCUMENTS

| | | | | |
|---|---|---|---|---|
| 4,525,741 A * | 6/1985 | Chahal et al. | .................. | 348/255 |
| 4,821,088 A * | 4/1989 | Tabei et al. | .................. | 348/280 |
| 6,236,434 B1 * | 5/2001 | Yamada | .................. | 348/315 |
| 6,466,265 B1 * | 10/2002 | Lee et al. | .................. | 348/308 |
| 6,538,695 B1 * | 3/2003 | Xiao et al. | .................. | 348/245 |
| 6,661,457 B1 * | 12/2003 | Mathur et al. | .................. | 348/273 |
| 6,801,255 B2 | 10/2004 | Inui | | |
| 6,903,670 B1 * | 6/2005 | Lee et al. | .................. | 341/118 |
| 7,148,927 B2 * | 12/2006 | Ogura et al. | .................. | 348/281 |
| 7,489,357 B2 * | 2/2009 | Nakada | .................. | 348/321 |
| 2002/0140830 A1 * | 10/2002 | Shirakawa et al. | .................. | 348/245 |
| 2003/0234884 A1 | 12/2003 | Nakada | | |
| 2005/0046719 A1 | 3/2005 | Inui | | |

FOREIGN PATENT DOCUMENTS

| | | |
|---|---|---|
| JP | H10285432 | 10/1998 |
| JP | 2001245220 | 9/2001 |
| JP | 2004209713 | 7/2003 |
| JP | 2003-259227 | 9/2003 |
| JP | 2004007471 | 1/2004 |
| JP | 2004015712 | 1/2004 |

OTHER PUBLICATIONS

Japanese Office Action for Japanese Patent Application No. 2005-128752, dated Jul. 9, 2010 (and English translation).

* cited by examiner

*Primary Examiner* — Timothy J Henn (74) *Attorney, Agent, or Firm* — McAndrews, Held & Malloy, Ltd.

(57) ABSTRACT

A CMOS image sensor includes: a plurality of CDS/PGAs (correlating double sampling/programmable gain amplifiers) for processing output signals of pixels corresponding to same colors on different paths; and an offset difference removing part for removing offset difference that occurs when the same color signals are processed on the different paths, wherein the offset difference removing part includes: a dummy pixel array where light is shielded; a unit for reading signals of the dummy pixel array through the CDS/PGAs and storing average offset values for each path; and a signal synthesizing unit for synthesizing the average offset values and signals of an effective pixel array, which are read through the respective CDS/PGAs, and outputting signals of which offset difference is removed.

15 Claims, 6 Drawing Sheets

FIG. 6

CMOS IMAGE SENSOR FOR HIGH SPEED SIGNAL PROCESSING

FIELD OF THE INVENTION

The present invention relates to a CMOS image sensor; and, more particularly, to a CMOS image sensor for high speed signal processing and a signal processing method therefor.

DESCRIPTION OF RELATED ART

An image sensor is an apparatus to convert an optical image into an electrical signal. Such an image sensor is largely classified into a complementary metal oxide semiconductor (CMOS) image sensor and a charge coupled device (CCD).

In the case of the CCD, individual MOS capacitors are disposed very close to one another and charge carriers are stored in the capacitors and transferred. Meanwhile, in the case of the CMOS image sensor, a pixel array is constructed using a technology of fabricating CMOS integrated circuit and output data are detected in sequence through a switching operation. Since the CMOS image sensor has an advantage of low power consumption, it is widely used in a personal communication system, such as a hand-held phone.

Figure 1:
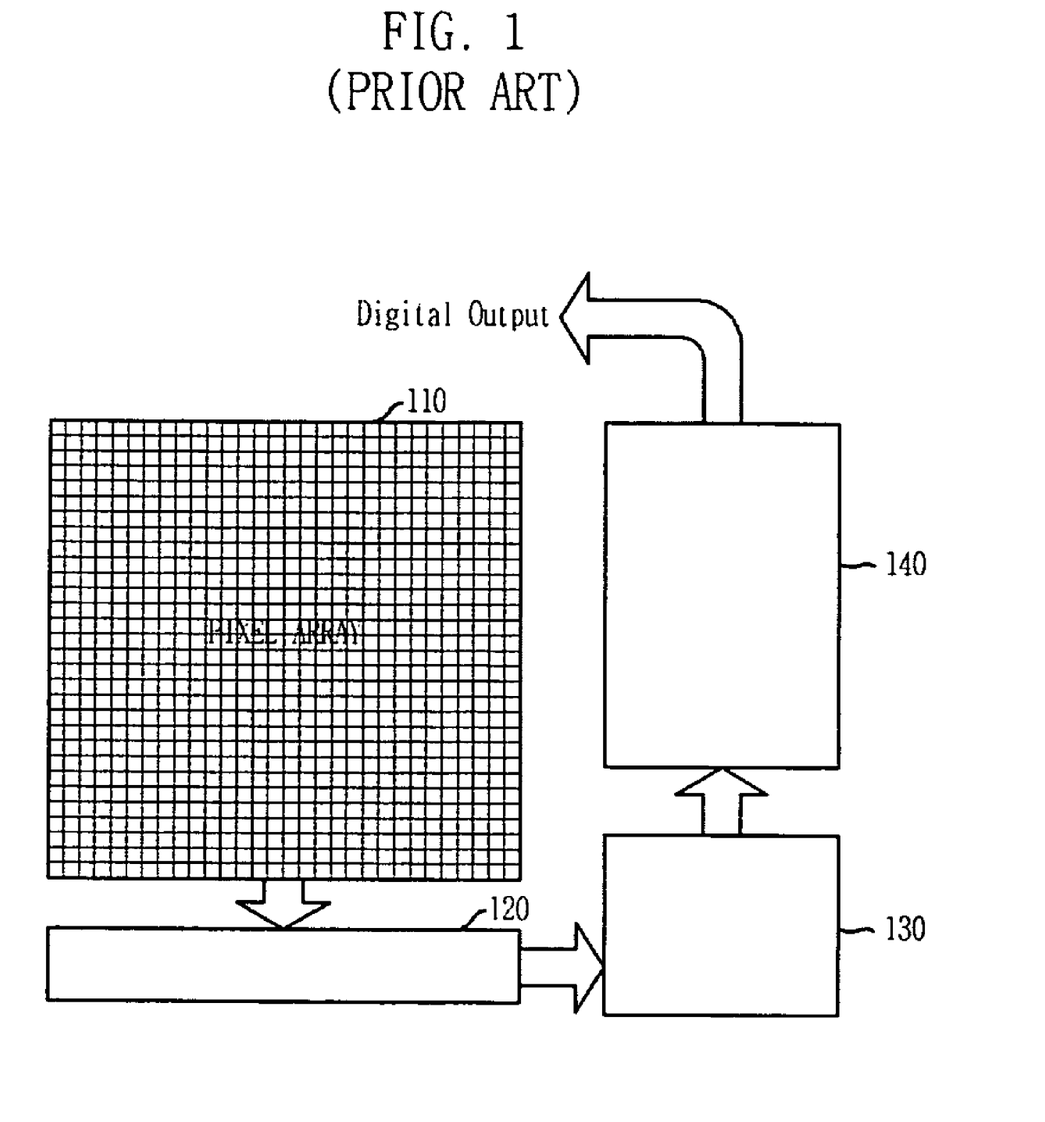
FIG. 1 is a diagram of a conventional CMOS image sensor, showing a signal processing path.

FIG. 1 is a block diagram of a conventional CMOS image sensor. In FIG. 1, a processing of image data signal obtained from pixels is shown.

Figure 2:
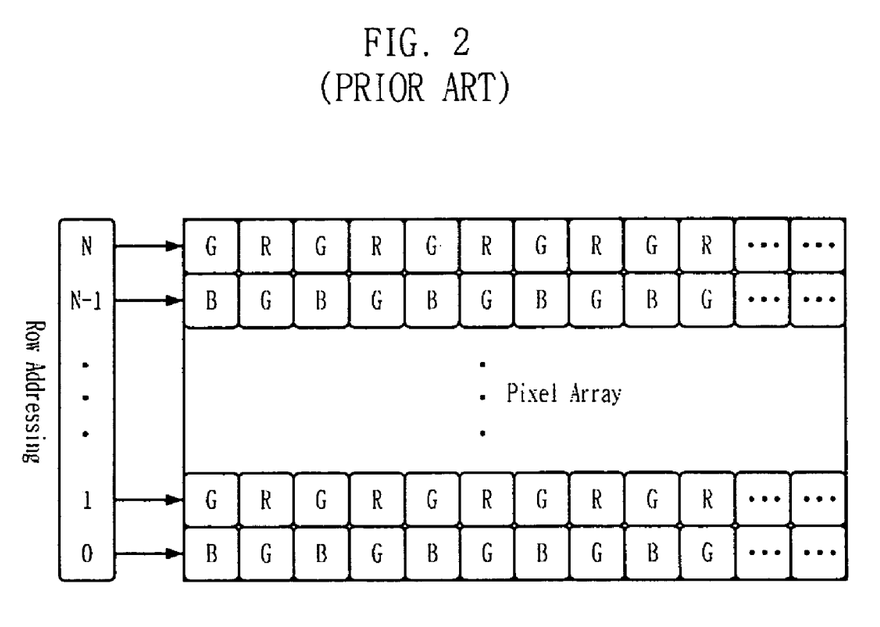
FIG. 2 is a diagram of a pixel array arrangement in a conventional CMOS image sensor.

FIG. 2 is a diagram of a pixel array arrangement of the conventional CMOS image sensor.

Referring to FIGS. 1 and 2, the conventional CMOS image sensor includes a pixel array 110 where red (R), green (G) and blue (B) pixels are arranged in an M_N matrix form (where M and N are positive integers). A correlated double sampling (CDS) part 120 including CDS circuits is provided at a lower side of the pixel array 110. The CDS circuit is provided at each column. An analog signal processor (ASP) part is provided at a right side of the pixel array 110 and processes the analog signals outputted from the CDS part 120. The ASP part is configured with a programmable gain amplifier (PGA) 130 and an analog-to-digital converter (ADC) 140.

Each CDS circuit of the CDS part 120 samples a reset signal and a data signal from a corresponding pixel. The PGA 130 calculates a difference between the reset signal and the data signal and amplifies it. The ADC 140 converts an analog signal inputted from the PGA 130 into a digital signal.

In reading a pixel data, the data of pixels arranged along one row of the pixel array 110 are transferred to the respective CDS circuits of the CDS part 120 at once and at the same time (at the same clock) by a row addressing. The outputs of the CDS circuits are sequentially applied on analog data buses by a column addressing and are transferred to the PGA 130.

As described above, according to the conventional CMOS image sensor, when one row is selected, the pixel signals (reset signal and data signal) of the selected row are stored in the corresponding CDS circuits. Then, the signals of the respective CDS circuits are sequentially transferred to the ASP by a column driver (not shown).

Meanwhile, as shown in FIG. 1, the analog signals obtained from the R, G and B pixel array pass through a single signal processing path and are converted into digital signals. Then, the imager processing is carried out using the digital signals.

However, when a large amount of data is processed through the single path, a processing speed of the corresponding path must be very fast. In addition, as an amount of data increases, the processing speed must increase much greater.

Further, in order for the high-speed operation, speed of the functional blocks (CDS, PGA, ADC) must increase. However, it is difficult to design the functional blocks to operate at high speed. Also, it is difficult to obtain signal stability. That is, if the functional blocks are designed to operate at high speed, a timing margin required for stabilizing signal values within a settling time becomes smaller. Consequently, reliability and productivity of the device may be badly affected.

SUMMARY OF THE INVENTION

It is, therefore, an object of the present invention to provide a CMOS image sensor, in which signal stability can be ensured using the low-speed functional blocks, while maintaining an entire signal processing speed. Further, it is possible to effectively remove the offset difference with respect to the same color signals, which may occur due to the multi-paths.

In accordance with an aspect of the present invention, there is provided a CMOS image sensor, including: a plurality of CDS/PGAs (correlating double sampling/programmable gain amplifiers) for processing output signals of pixels corresponding to same colors on different paths; and an offset difference removing part for removing offset difference that occurs when the same color signals are processed on the different paths, wherein the offset difference removing part includes: a dummy pixel array where light is shielded; a unit for reading signals of the dummy pixel array through the CDS/PGAs and storing average offset values for each path; and a signal synthesizing unit for synthesizing the average offset values and signals of an effective pixel array, which are read through the respective CDS/PGAs, and outputting signals of which offset difference is removed.

In accordance with another aspect of the present invention, there is provided a CMOS image sensor, including: a pixel array including R pixels, G pixels, B pixels, an effective pixel array and a dummy pixel array where light is shielded; a first analog signal processing path, disposed at one side of the pixel array, for processing analog signals outputted from the G pixels of the pixel array; and a second analog signal processing path, disposed at the other side of the pixel array, for processing analog signals outputted from the B pixels or the R pixels of the pixel array, wherein each of the first and second analog signal processing path includes: a plurality of CDS/PGAs for processing output signals of pixels corresponding to same colors on different paths; an ADC receiving output signals of the CDS/PGAs; a digital signal processor (DSP) for reading signals of the dummy pixel array through the CDS/PGAs and the ADC, and generating a digital average offset value for each path; a unit for converting the digital average offset value into an analog average offset value; and a signal synthesizing unit for synthesizing the analog average offset value and signals of the effective pixel array, which are read through the CDS/PGAs, and outputting the synthesized signal to the ADC.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

Hereinafter, the present invention will be described in detail with reference to the accompanying drawings.

In accordance with the present invention, analog signals are processed through multi-paths so as to ensure a signal stability using low-speed functional blocks, while maintaining an entire signal processing speed. Also, offset values existing on respective paths are previously read through dummy pixels where light is shielded, and their average value is stored. When signals are outputted from effective pixels, the value is removed for each path. In this manner, the offset values that occur when the same color signals within the pixel array are processed through different paths can be effectively removed.

Figure 3:
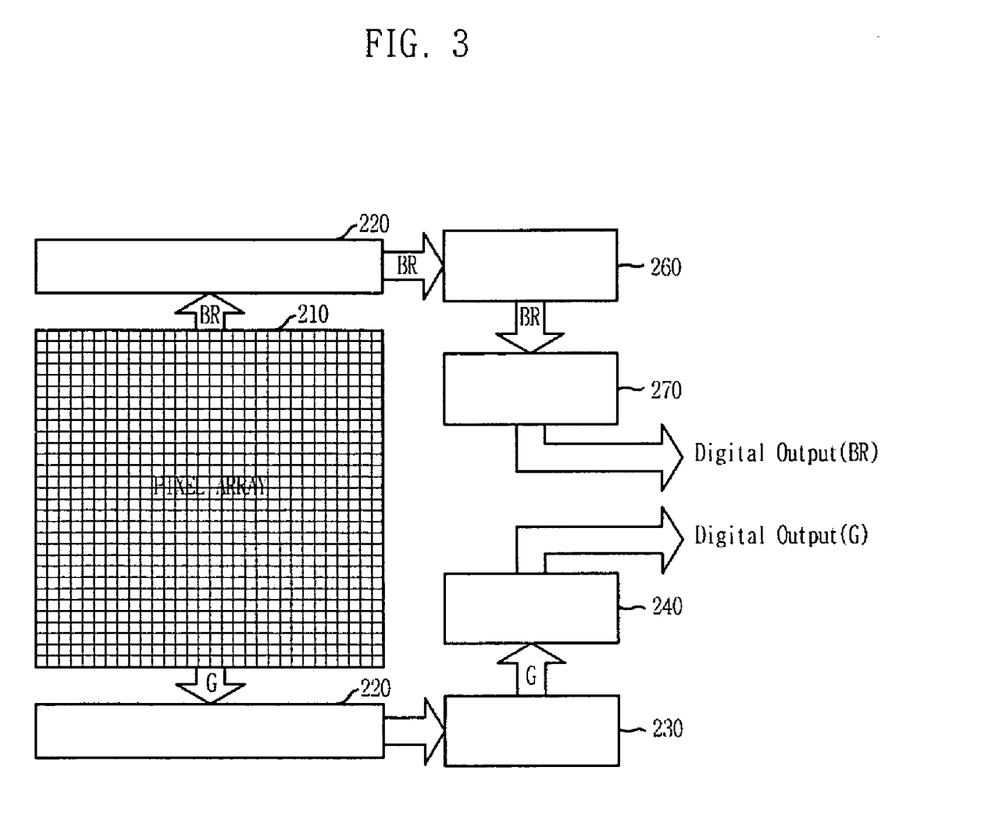
FIG. 3 is a block diagram of a CMOS image sensor in accordance with an embodiment of the present invention.

FIG. 3 is a block diagram of a CMOS image sensor in accordance with an embodiment of the present invention.

Figure 5:
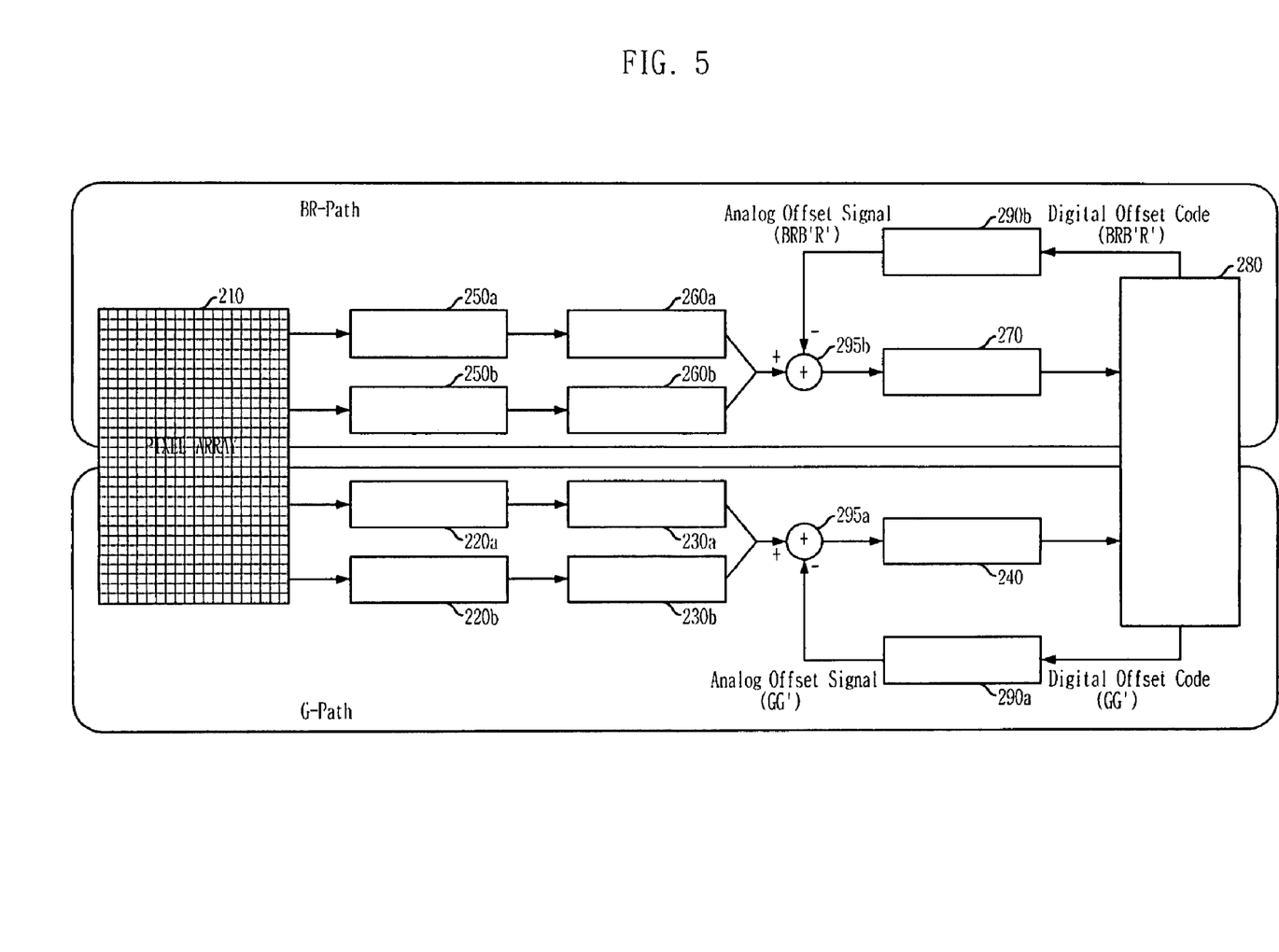
FIG. 5 is a block diagram of a CMOS image sensor in accordance with the present invention, showing a signal processing and an offset difference removal.

Referring to FIG. 3, analog signals outputted from pixels are parallel processed. That is, a G-path 220, 230 and 240 processes signals of G pixels, and a BR-path 250, 260 and 270 processes signals of B and G pixels. Also, as shown in FIG. 5, the G-path is divided into G-paths 220*a*, 230*a* and 240 and G'-path 220*b*, 230*b* and 240, and the BR-path is divided into BR-paths 250*a*, 260*a* and 270 and a B'R'-path 250*b*, 260*b* and 270. In the prior art, all R, G and B pixel signals are processed on a single path. On the contrary, in the present invention, the R, G and B pixel signals are separately processed on four paths of G, G', BR and B'R'. Accordingly, a processing speed at the corresponding path can be lowered by ¼ time, thereby solving the difficulty in circuit design and ensuring signal stability.

The image sensor in accordance with the present invention will be described below in more detail with reference to FIGS. 4 and 5. First, a structure of a pixel array will be described with reference to FIG. 4.

Figure 4:
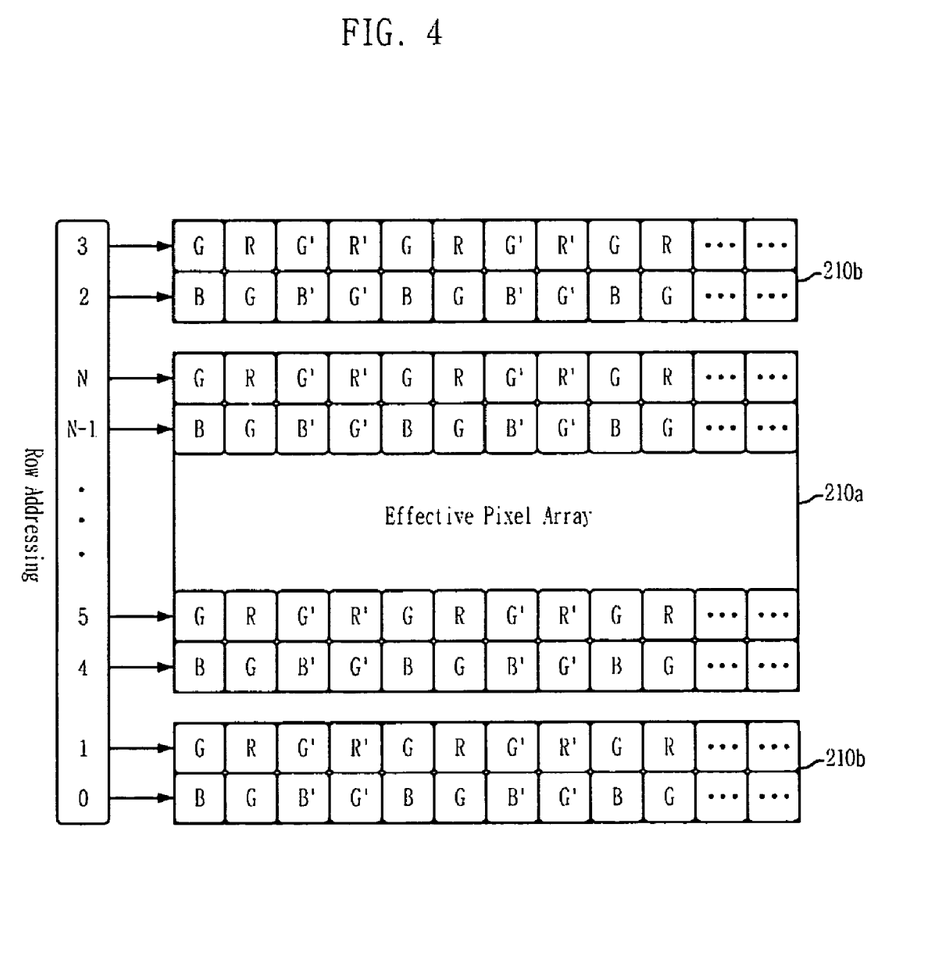
FIG. 4 is a diagram of a pixel array having a dummy pixel in a CMOS image sensor in accordance with an embodiment of the present invention.

FIG. 4 is a diagram of a pixel arrangement of a pixel array 210 having a dummy pixel array for measuring an offset value in a CMOS image sensor in accordance with the present invention.

The pixel array 210 includes three types of pixels, that is, R pixels, G pixels and B pixels. In general, the pixel array 210 includes even rows and odd rows. In the even row, a G pixel is arranged in a first column, and a G pixel and an R pixel are alternately arranged. In the odd row, a B pixel is arranged in a first column, and a B pixel and a G pixel are alternately arranged. Consequently, as shown in FIG. 4, the arrangement of the R, G and B pixels has R:G:B=1:2:1. Accordingly, as shown in FIG. 3, the pixel signals can be parallel processed on the divided paths, that is, the G-paths 220*a*, 230*a* and 240*a* and the BR-paths 220*b*, 230*b* and 240*b*.

Also, the pixel array 210 includes an effective pixel array 210*a* and a dummy pixel array 210*b*. The effective pixel array 210 is configured with R, G and B pixels arranged in an M×N matrix form (where M and N are positive integers). In the dummy pixel array 210*b*, light shielding material (for example, metal material) is disposed on light receiving elements, thereby preventing light incidence. The dummy pixel array 210*b* where an even row and an odd row are paired is disposed on upper and lower sides of the effective pixel array 210*a*.

If signals of the dummy pixel array 210*b* are read before reading pixel signals, intrinsic offset signals including offset signals existing in pixels and offset signals existing in CDS part, PGA and ADC can be obtained from each pixel.

Referring again to FIGS. 4 and 5, the pixel array 210 includes the R, G and B pixels, the effective pixel array 210*a*, and the dummy pixel array 210*b* with the light shielding.

The G-path is arranged at one side of the pixel array 210 and processes the analog signals outputted from the G pixels. The BR-path is arranged at the other side of the pixel array 210 and processes the analog signals outputted from the B pixels or the R pixels.

The G-path includes: a CDS(G) 220*a* and a PGA(G) 230*a* for processing output signals of G pixels; a CDS(G') 220*b* and a PGA(G') 230*b* for processing output signals of G' pixels; an ADC(GG') 240 for receiving signals from the CDS(G)/PGA(G) 220*a* and 230*a* and the CDS(G')/PGA(G') 220*b* and 230*b*; a digital signal processor (DSP) 280 for reading signals of the dummy pixel array through each path formed by the CDS/PGA/ADC and generating an average offset value for each path; an offset DAC(GG') 290*a* for converting a digital offset code corresponding to the average offset value into an analog offset signal corresponding to an analog average offset value; a signal synthesizer 295*a* for synthesizing signals of the effective pixel array, which are read through the CDS(G)/PGA(G) and CDS(G')/PGA(G'), and the analog offset signal and outputting the synthesized signal to the ADC(GG') 270*a*.

Similarly, the BR-path includes: a CDS(BR) 250*a* and a PGA(BR) 260*a* for processing output signals of BR pixels (exactly, B pixels or R pixels); a CDS(B'R') 250*b* and a PGA(B'R') 260*b* for processing output signals of B'R' pixels; an ADC(BRB'R') 270 for receiving signals from the CDS(BR)/PGA(BR) 250*a* and 260*a* and the CDS(B'R')/PGA(B'R') 250*b* and 260*b*; a digital signal processor (DSP) 280 for reading signals of the dummy pixel array through each path formed by the CDS/PGA/ADC and generating an average offset value for each path; an offset DAC(BRB'R') 290*b* for converting a digital offset code corresponding to the average offset value into an analog offset signal corresponding to an analog average offset value; a signal synthesizer 295*b* for synthesizing signals of the effective pixel array, which are read through the CDS(BR)/PGA(BR) and CDS(B'R')/PGA(B'R'), and the analog offset signal and outputting the synthesized signal to the ADC(BRB'R') 270.

While the pixel signals pass through the respective functional blocks (CDS, PGA, ADC), unintended additional signals as well as original signals the pixel signals may be added to the pixel signals. Such offset signals may have different values in each path. Accordingly, due to the addition of the offset values that are different according to the path difference, a fixed pattern noise (FPN) may occur in an output image of the pixel signals G-G', R-R' and B-B' having the different signal processing paths but the same property.

In order to solve this problem, the offset values existing on respective paths are previously read and their average value is stored. Then, when effective pixel signals are outputted, the value is removed in each path.

In more detail, the dummy pixel array is disposed at upper and lower sides of the pixel array. In the dummy pixel array, light shielding material (for example, metal material) is disposed on the light receiving elements of the respective pixels in the pixel array, thereby preventing light incidence. If signals of the dummy pixel array are read before reading pixel signals, intrinsic offset signals including offset signals existing in pixels and offset signals existing in the CDS, PGA and ADC can be outputted from each pixel.

Figure 6:
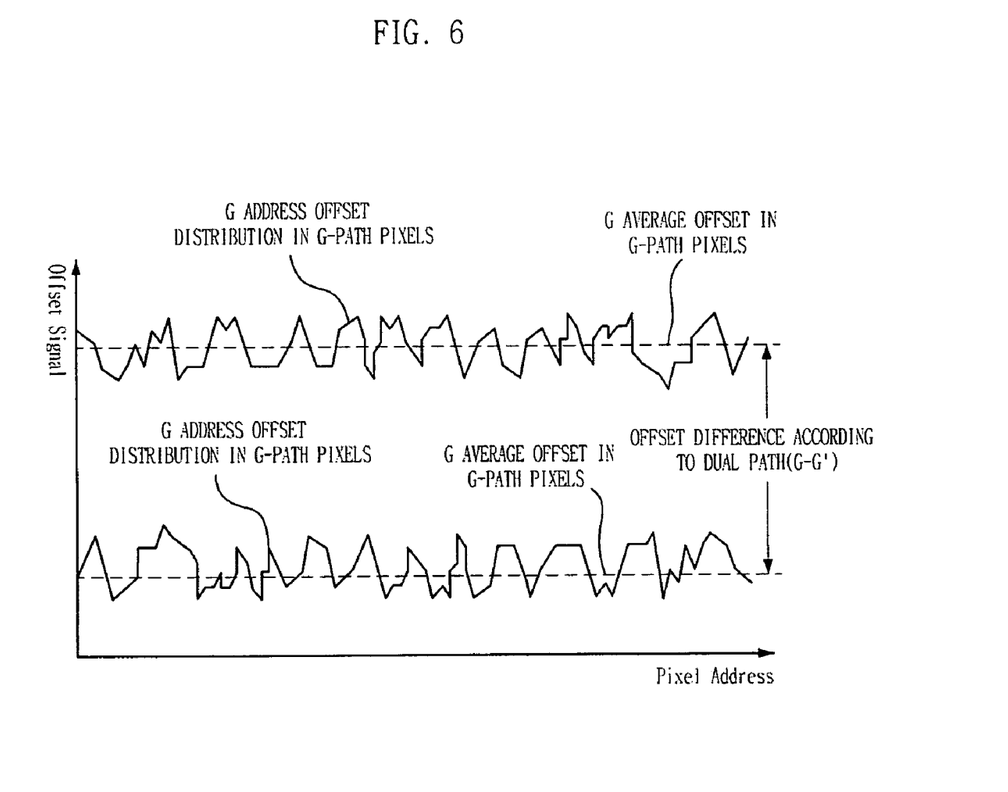
FIG. 6 is a graph illustrating an offset difference in multi-paths.

Referring to FIG. 6, in the G-path, G address offset signals are distributed and G' address offset signals are distributed. If calculating an average value of the respective pixel signals, an offset difference according to G-G' dual path difference appears. Such an offset difference causes the FPN on the output image. Accordingly, when the effective pixel signals are inputted, the average offset value that is previously read from the dummy pixel and stored is converted into the analog signal in the offset DACs 290a and 290b, and then subtracted. Consequently, an intrinsic signal whose offset is removed is outputted as a final output.

There are four paths and six signals G, G', B, B', R and R' are outputted through the paths. Therefore, six average offset values are required.

As a result, the high-speed signal processing can be achieved using the low-speed functional blocks and the offset difference caused due to the multi-paths can be effectively removed.

In order to improve the processing speed, the path can be extended to more than four paths. Also, although one ADC is arranged with respect to two paths (for example, G-G') in FIG. 5, one ADC having lower speed may be arranged in each path. If the ADC has a high speed, only one ADC may be arranged in an entire path.

For the dummy pixel array arranged in the upper and lower sides of the effective pixel array, its position and number may be changed for the purpose of calculating intrinsic average offset value.

Also, the light shielding material used for calculating the intrinsic offset value in the dummy pixel may be any material that can effectively shield the light.

In accordance with the present invention, the pixel signals are processed using the multi-paths having the parallel structure. Therefore, signal stability can be ensured using the low-speed functional blocks, while maintaining an entire signal processing speed. Further, it is possible to effectively remove the offset difference with respect to the same color signals, which may occur due to the multi-paths.

While the present invention has been described with respect to the particular embodiments, it will be apparent to those skilled in the art that various changes and modifications may be made without departing from the spirit and scope of the invention as defined in the following claims.

What is claimed is:

1. A complementary metal-oxide semiconductor (CMOS) image sensor, comprising:
   a pixel array including red (R) pixels, green (G) pixels, blue (B) pixels, an effective pixel array, and a dummy pixel array configured to be shielded from light;
   a first analog signal processing path and configured to process analog signals output from the G pixels of the pixel array, wherein the first analog signal processing path is subdivided into a G sub-path and a G' sub-path; and
   a second analog signal processing path configured to process analog signals output from both the B pixels and the R pixels of the pixel array, wherein the second analog signal processing path is subdivided into a BR sub-path and a B'R' sub-path;
   wherein each of the first and second analog signal processing paths includes:
      a plurality of correlated double-sampling/programmable gain amplifiers (CDS/PGAs) configured to process output signals of pixels corresponding to same colors on different paths;
      a digital signal processor (DSP) configured to generate a digital average offset value for each path using signals of the dummy pixel array;
      a unit configured to convert each digital average offset value into at least one analog average offset value; and
      a signal synthesizing unit configured to synthesize the analog average offset value and signals of the effective pixel array, configured to output a synthesized signal; wherein a first portion of the G pixel signals are processed on the G sub-path, a second portion of the G pixels are processed on the G' sub-path, a first portion of the R pixels and a first portion of the B pixels are processed on the BR sub-path, and a second portion of the R pixels and a second portion of the B pixels are processed on the B'R' sub-path.

2. The CMOS image sensor of claim 1, wherein the pixel array further includes:
   even rows where a G pixel is arranged in a first column and a G pixel and an R pixel are alternately arranged; and
   odd rows where a B pixel is arranged in a first column and a B pixel and a G pixel are alternately arranged;
   wherein the even rows and the odd rows are alternately disposed.

3. The CMOS image sensor of claim 2, wherein the dummy pixel array comprises:
   an even row where a G pixel is arranged in a first column and a G pixel and an R pixel are alternately arranged; and
   an odd row where a B pixel is arranged in a first column and a B pixel and a G pixel are alternately arranged;
   wherein the even row and the odd row are paired.

4. The CMOS image sensor of claim 3, wherein the dummy pixel array is disposed at upper and lower sides of the effective pixel array.

5. The CMOS image sensor of claim 1, wherein the at least one ADC comprises a plurality of ADCs, and wherein one ADC is disposed at each CDS/PGA.

6. The CMOS image sensor of claim 1, wherein the at least one ADC corresponds to a plurality of CDS/PGAs.

7. The CMOS image sensor of claim 1, wherein an upper portion of a light-receiving element for each pixel contained in the dummy pixel array is covered with a light-shielding metal.

8. A complementary metal-oxide semiconductor (CMOS) image sensor, comprising:
   a pixel array including red (R) pixels, green (G) pixels, blue (B) pixels, an effective pixel array, and a dummy pixel array;
   a first analog signal processing path subdivided into a G sub-path and a G' sub-path; and
   a second analog signal processing path subdivided into a BR sub-path and a B'R' sub-path;
   wherein each of the first and second analog signal processing path includes:
      a plurality of correlated double-sampling/programmable gain amplifiers (CDS/PGAs); and
      a digital signal processor (DSP); wherein a first portion of the G pixel signals are processed on the G sub-path, a second portion of the G pixels are processed on the G' sub-path, a first portion of the R pixels and a first portion of the B pixels are processed on the BR sub-path, and a second portion of the R pixels and a second portion of the B pixels are processed on the B'R' sub-path.

9. The CMOS image sensor of claim 8, wherein the pixel array comprises:

even rows where a G pixel is arranged in a first column and a G pixel and an R pixel are alternately arranged; and odd rows where a B pixel is arranged in a first column and a B pixel and a G pixel are alternately arranged;

wherein the even rows and the odd rows are alternately disposed.

10. The CMOS image sensor of claim 9, wherein the dummy pixel array comprises:

an even row where a G pixel is arranged in a first column and a G pixel and an R pixel are alternately arranged; and an odd row where a B pixel is arranged in a first column and a B pixel and a G pixel are alternately arranged;

wherein the even row and the odd row are paired.

11. The CMOS image sensor of claim 8, wherein the at least one ADC comprises a plurality of ADCs, and wherein one ADC is disposed at each CDS/PGA.

12. The CMOS image sensor of claim 8, wherein the at least one ADC corresponds to a plurality of CDS/PGAs.

13. A complementary metal-oxide semiconductor (CMOS) image sensor, comprising:

a pixel array including red (R) pixels, green (G) pixels, blue (B) pixels, an effective pixel array, and a dummy pixel array;

a first analog signal processing path configured to process analog signals output from the G pixels of the pixel array, wherein the first analog signal processing path is subdivided into a G sub-path and a G' sub-path; and a second analog signal processing path configured to process analog signals output from both the B pixels and the R pixels of the pixel array, wherein the second analog signal processing path is subdivided into a BR sub-path and a B'R' sub-path; wherein a first portion of the G pixel signals are processed on the G sub-path, a second portion of the G pixels are processed on the G' sub-path, a first portion of the R pixels and a first portion of the B pixels are processed on the BR sub-path, and a second portion of the R pixels and a second portion of the B pixels are processed on the B'R' sub-path.

14. The CMOS image sensor of claim 13, wherein the pixel array further comprises:

even rows where a G pixel is arranged in a first column and a G pixel and an R pixel are alternately arranged; and odd rows where a B pixel is arranged in a first column and a B pixel and a G pixel are alternately arranged;

wherein the even rows and the odd rows are alternately disposed.

15. The CMOS image sensor of claim 14, wherein the dummy pixel array includes:

an even row where a G pixel is arranged in a first column and a G pixel and an R pixel are alternately arranged; and an odd row where a B pixel is arranged in a first column and a B pixel and a G pixel are alternately arranged;

wherein the even row and the odd row are paired.

* * * * *

UNITED STATES PATENT AND TRADEMARK OFFICE
CERTIFICATE OF CORRECTION

PATENT NO. : 8,045,029 B2  
APPLICATION NO. : 11/114386  
DATED : October 25, 2011  
INVENTOR(S) : Kim et al.

Page 1 of 1

It is certified that error appears in the above-identified patent and that said Letters Patent is hereby corrected as shown below:

Title page, item (56), under "Foreign Patent Documents", in Column 2, Line 1, delete "JP H10285432 10/1998" and insert -- JP H10285432 10/1998
   JP 2000-32344 1/2000 --.

Title page, item (56), under "Other Publications", in Column 2, Lines 1-2, delete "Japanese Office Action for Japanese Patent Application No. 2005-128752, dated Jul. 9, 2010 (and English translation)." and insert -- Japanese Office Action for Japanese Patent Application No. 2005-128752, dated Jul. 9, 2010 (and English translation).
English translation of Japanese Office Action for Japanese Patent Application No. 2005-128752, dated Mar. 29, 2011. --.

Column 5, line 54, in Claim 1, delete "path and configured to" and insert -- path configured to --.

Column 6, line 10, in Claim 1, delete "array, configured to" and insert -- array, and configured to --.

Signed and Sealed this
Fifteenth Day of May, 2012

David J. Kappos
*Director of the United States Patent and Trademark Office*